US009385923B2

(12) United States Patent
Himura et al.

(10) Patent No.: US 9,385,923 B2
(45) Date of Patent: *Jul. 5, 2016

(54) CONFIGURATION MANAGEMENT METHOD OF LOGICAL TOPOLOGY IN VIRTUAL NETWORK AND MANAGEMENT SERVER

(71) Applicant: Hitachi, Ltd., Tokyo (JP)

(72) Inventors: Yosuke Himura, Tokyo (JP); Yoshiko Yasuda, Tokorozawa (JP); Mariko Nakayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 49 days.

This patent is subject to a terminal disclaimer.

(21) Appl. No.: 14/297,020

(22) Filed: Jun. 5, 2014

(65) Prior Publication Data

US 2014/0289404 A1  Sep. 25, 2014

Related U.S. Application Data

(63) Continuation of application No. 13/565,174, filed on Aug. 2, 2012, now Pat. No. 8,750,165.

(30) Foreign Application Priority Data

Oct. 4, 2011  (JP) .................................. 2011-219714

(51) Int. Cl.
*H04L 12/28* (2006.01)
*H04L 12/24* (2006.01)
*H04L 12/46* (2006.01)

(52) U.S. Cl.
CPC ............ *H04L 41/12* (2013.01); *H04L 12/4641* (2013.01); *H04L 41/22* (2013.01)

(58) Field of Classification Search
USPC ........................................................ 709/220
See application file for complete search history.

(56) References Cited

U.S. PATENT DOCUMENTS 7,593,352 B2   9/2009  Verma
7,991,859 B1   8/2011  Miller et al.
8,312,129 B1   11/2012 Miller et al.

(Continued)

FOREIGN PATENT DOCUMENTS

JP    2009-194675 A   8/2009
WO    2011/118585 A1  9/2011

OTHER PUBLICATIONS

Ipisa Ohtani, "Managers Dreams Come True! Visio Making a Network Visual and Being Monitored", Nov. 8, 2010, URL, http://ascii.jp/elem/000/000/567/567873/.

*Primary Examiner* — Duc C Ho
(74) *Attorney, Agent, or Firm* — Volpe and Koenig, P.C.

(57) ABSTRACT

(1) A configuration management in a management server is carried out such that setting patterns regarding creation of plural types of virtual resources and setting patterns regarding connection between the plural types of virtual resources are extracted from setting information of network devices configuring a virtual network by using plural types of virtualization technologies, (2) an ID required for creating a virtual resource and a connection relation between virtual resources are extracted from the extracted setting pattern, (3) an element corresponding to a virtual resource or a connection between a pair of virtual resources is created by using information including the extracted ID, and (4) the elements created from setting information of individual devices are aggregated to thereby create logical topology information representing a topology of the virtual network.

16 Claims, 16 Drawing Sheets

(56) References Cited

U.S. PATENT DOCUMENTS

| | | |
|---|---|---|
| 8,392,608 B1 | 3/2013 | Miller et al. |
| 2003/0145069 A1 | 7/2003 | Lau et al. |
| 2007/0043860 A1 | 2/2007 | Pabari |
| 2008/0244595 A1 | 10/2008 | Eilam et al. |
| 2009/0207756 A1 | 8/2009 | Sakai et al. |
| 2010/0017517 A1* | 1/2010 | Arai .................... G06F 9/5077 709/226 |
| 2011/0075674 A1* | 3/2011 | Li ....................... H04L 12/5695 370/401 |
| 2013/0003745 A1 | 1/2013 | Nishimura |
| 2013/0336331 A1* | 12/2013 | Woerndle ............ H04L 12/4641 370/409 |

* cited by examiner

FIG. 3

NETWORK DEVICE MANAGING TABLE 204

| DEVICE ID | DEVICE MODEL | IP ADDRESS | USER NAME | PASSWORD | FILE NAME |
|---|---|---|---|---|---|
| SW-A | aaa | x.x.x.x | operator | ****** | A.txt |
| SW-B | aaa | y.y.y.y | admin | ****** | B.txt |
| FW-A | bbb | z.z.z.z | admin | ****** | C.txt |
| LB-A | ccc | w.w.w.w | admin | ****** | D.txt |

NODE PATTERN MANAGING TABLE 241a

| NODE TYPE | CREATION PATTERN OF MODEL aaa |
|---|---|
| N1 | vlan <id><br>:<br>! |
| N2 | interface vlan <id><br>:<br>ip address x.x.x.x<br>:<br>! |
| N3 | vrf definition <id><br>:<br>! |

- 411 (row N1)
- 412 (row N2)
- 413 (row N3)

FIG. 5

EDGE PATTERN MANAGING TABLE 242a

| EDGE TYPE (501) | CONNECTION NODE TYPE (502) | CONNECTION PATTERN OF MODEL aaa (503) | |
|---|---|---|---|
| E1 | N1,N2 | interface vlan \<id\><br>:<br>   ip address x.x.x.x<br>:<br>! | 511 |
| E2 | N2,N3 | interface vlan \<id1\><br>:<br>   vrf forwarding \<id2\><br>:<br>! | 512 |
| E3 | N3,N3 | route-map \<name\><br>:<br>   match vrf \<id1\><br>:<br>!<br>:<br>:<br>vrf definition \<id2\><br>:<br>   import inter-vrf \<name\><br>:<br>! | 513 |

FIG. 6

NODE MANAGING TABLE  243

| NODE ID | NODE TYPE | DEVICE ID | INTERNAL TYPE ID | |
|---|---|---|---|---|
| 1 | N1 | — | 10 | ~611 |
| 2 | N2 | SW1 | 10 | ~612 |
| 3 | N3 | FW1 | 1 | ~613 |
| 4 | N1 | — | 20 | ~614 |
|  |  |  |  | ~615 |

Columns: 601, 401, 603, 604

FIG. 7

EDGE MANAGING TABLE 244

| EDGE ID | EDGE TYPE | NODE ID | NODE ID | |
|---------|-----------|---------|---------|---|
| 1 | E1 | n1 | n2 | ~711 |
| 2 | E2 | n3 | n5 | ~712 |
|   |    |    |    | ~713 |

SINGLE EDGE CREATING/REGISTERING PROCESSING AT STEP S1110

CONFIGURATION MANAGEMENT METHOD OF LOGICAL TOPOLOGY IN VIRTUAL NETWORK AND MANAGEMENT SERVER

INCORPORATION BY REFERENCE

This application is a continuation of U.S. patent application Ser. No. 13/565,174 filed Aug. 2, 2012, which claims priority based on Japanese patent application, No. 2011-219714 filed on Oct. 4, 2011, the entire contents of which are incorporated herein by reference.

BACKGROUND

The subject matter disclosed herein relates to virtual networking, a configuration management server and a configuration management method.

In recent years, a complex virtual network for enabling to have various configurations has been constructed by using a combination of a plurality of virtualization technologies, in the technical field of computer networking.

The virtualization technology includes that of L2 (Layer 2) layer and of L3 (Layer 3) layer. The virtualization technology for L2 layer includes a virtual LAN (Local Area Network) technique, such as IEEE802.1Q VLAN (Virtual Local Area Network), and a virtual interface technique, such as VLAN-interface and a sub-interface. The virtualization technology of L3 layer also includes a virtual router technique, such as VRF (Virtual Routing and Forwarding) and VR (Virtual Router).

In an office network, for example, a construction and configuration change for the virtual network have been easily realized by using the virtual LAN technique and virtual interface technique without the restriction stemming from the structure of physical network. In a datacenter network and career network, customer networks having various network configurations is virtually consolidated over a single physical network by combining the virtual router technique in addition to the above-described technique.

However, it has been difficult to maintain the correct information of a logical structure (logical topology) of the virtual network, as a result of realizing the complex configuration of virtual network. Physical devices configuring the network respectively function as if a plurality of virtual devices are present respectively inside the physical devices, and the virtual devices are coupled with each other by virtual links that are invisible to human eyes. As a result, the logical topology of the virtual network cannot be easily understood by only seeing a physical network. In contrast, even though one tries to determine the logical topology of the virtual network by checking information of configuration settings of the devices (config), the highly increased amount of items of setting information are set in the device group in the case of complex virtual network, therefore, it is difficult to acquire the entire logical topology of virtual network from the setting information of physical devices.

An existing method having been adopted for acquiring the logical topology of virtual network and its problem are described below. First, there is a method such that the logical topology of virtual network is written in a management document to hold it. A problem of this method is that information written in the management document is sometimes not coincident with settings actually set in the devices when one changes the device settings without updating the documents. Second, there is another method adopted to solve the above-described problem, that is, the setting information of the devices is manually inspected to draw a logical topology diagram. However, in the complex virtual network, the highly increase amount of items of setting information are set in the device as described above. Therefore, this method is not realistic since it possibly causes human error and takes a lot of time.

In order to solve the problem possessed in the existing method, an object is that the setting information of devices (config) is analyzed automatically to then create the logical topology information of virtual network automatically. The information of the logical topology of virtual network can be acquired if the config of device can be automatically analyzed, so that it can reduce the time to acquire the logical topology while reducing the human error.

In contrast to the above-described object, there is related art for automatically creating the logical topology information in the virtual network.

U.S. Pat. No. 7,593,352 discloses to automatically create a relation of information exchange among the virtual routers as the virtualization technology of L3. This technique is used for VPN (Virtual Private Network) service in MPLS (Multi Protocol Label Switching) network. By using this technique, a path exchange relation among the respective virtual routers for a plurality of customer sites can be acquired from the setting information of VRF in MPLS routers.

JP-A-2009-194675, the counterpart US Publication of which is US 2009-0207756, discloses to automatically create topology information of VLAN in the virtualization technology of L2. This technique is that the setting information regarding the VLAN interface is used from the config information set in the devices in a network environment made up of switches and routers to create logical topology information configured by a plurality of VLANs.

SUMMARY

The problem of the above-described related art is that the logical topology information of virtual network cannot be created in the network environment using the plurality of virtualization technologies.

The technique disclosed in U.S. Pat. No. 7,593,352 is only for router realizing VPN, and it can create the topology information only regarding the virtual router, but cannot create the topology information regarding the virtual LAN. In the office network and datacenter network, the virtual LAN is a generally used technique, but this technique has a problem such that the logical topology information cannot be determined.

The technique disclosed in JP-A-2009-194675 is only for switch and router realizing VLAN. There is a problem that the logical topology of virtual network cannot be correctly acquired in the environment using the virtual router technique.

Further, this article has not disclosed the detailed information about the realization of the technique such as the structure of tables.

Therefore, there arises a problem that the logical topology information cannot be created in the complex virtual network environment configured by combining the virtual LAN, virtual interface and virtual router techniques, etc., in U.S. Pat. No. 7,593,352 and JP-A-194675. In the virtual network using the plural virtualization technologies, information to be managed and associated is complex, compared with the use of single virtualization technology. Such problem cannot be solved easily by simply extending related art.

The technique disclosed in this description is to create automatically the logical topology information of virtual network constructed by using the plural virtualization technologies. The plural virtualization technologies include at least one or more of the virtual LAN, virtual interface and virtual router techniques.

According to one aspect of the present disclosure, in a configuration management method of a logical topology in a virtual network, including plural types of virtual resources configured by plural types of virtualization technologies, constructed on an information processing system coupled with physical devices including server device, storage device and network device by a network, the configuration management method comprises: a step of holding a creation pattern for specifying either the plural types of virtual resources created by the plural types of virtualization technologies and a connection pattern for specifying either connection relations between the plural types of virtual resources; a step of extracting information of a plurality of virtual resources and connection information between a plurality of virtual resources, from setting information set in the physical devices in accordance with the creation pattern and the connection pattern; and a step of creating logical topology information of the virtual network in accordance with the extracted information.

The method may further comprise: a step of managing information, for every plurality of physical devices, used for collecting the setting information of the plurality of physical devices configured to form the virtual network; and a step of collecting the setting information of the physical devices by using the managed information.

The method may further comprise a step of making the created logical topology information visualized, and a step of adding or deleting the virtual resource information configuring the visualized logical topology information or a part of the connection information between the virtual resources, in response to a management request.

The method may further comprise a step of extracting a parameter for identifying the virtual resource information from the setting information set in the physical devices in accordance with the creation pattern and the connection pattern.

The method may comprise that the virtual resource information includes information indicating a type of the virtual resource, an ID of the physical device possessing the virtual resource and an ID for identifying the virtual resource in the type of the virtual resource, and the connection information between the virtual resources includes two pieces of the virtual resource connected each other.

In the case where the virtual resource information is associated with a node and the connection information of the virtual resource is associated with an edge, the method may further comprise a step of creating the node from the setting information set in the physical device in accordance with the creation pattern, a step of creating the edge from the setting information set in the physical device in accordance with the connection pattern, and a step of creating a graph made up of nodes and edges corresponding to the logical topology of the virtual network.

The method may comprise that a node type representing a type of virtual resource is associated with the creation pattern, an edge type representing a type of the connection relation of the virtual resource is associated with the connection pattern, the logical topology information includes at least three types of the node type and at least two types of the edge type, node information representing the created node includes a node ID related to the node type, a physical device ID, and an ID in the node type, for uniquely identifying the node, and edge information representing the created edge includes the edge type, and the node ID of two nodes to be coupled with the edge.

In addition, the information processing system provides the management server, and the configuration management method of the logical topology may be carried out by the management server.

The above-described aspect is applicable to the information processing system to be constructed by using the virtualization technology.

According to the teaching herein, the logical topology can be acquired rapidly and accurately in the virtual network constructed by using the plural virtualization technologies.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a diagram showing an example of a network device managing table 204;

FIG. 4 is a diagram showing an example of a node pattern managing table 241a;

FIG. 5 is a diagram showing an example of an edge pattern managing table 242a;

FIG. 6 is a diagram showing an example of a node managing table 243;

FIG. 7 is a diagram showing an example of an edge managing table 244;

DESCRIPTION OF THE EMBODIMENTS

Hereinafter, one embodiment will be described with an example of creating logical topology information of a virtual network in a network system of a datacenter. In addition, the datacenter network is one aspect for an application in principle and includes a network straddled a plurality of datacenters, a career network, an office network, a campus network, etc.

Figure 1:
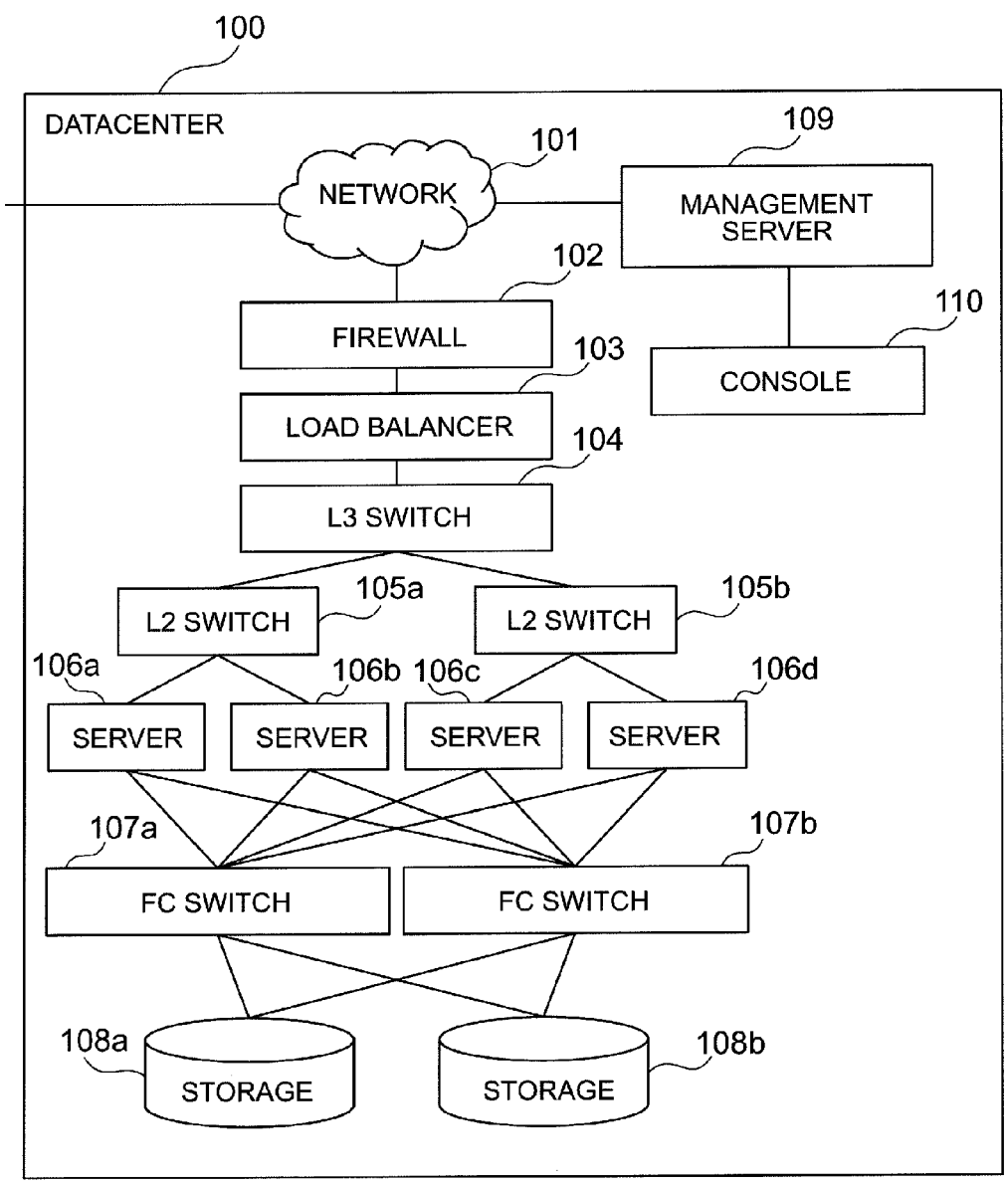
FIG. 1 is a diagram showing an example of a system in an embodiment.

FIG. 1 is a diagram showing an example of a system configuration in this embodiment.

A datacenter 100 includes a system for supplying an appropriate ICT service via a network 101. This system, including devices as configuration elements, includes: server devices such as servers 106a, 106b, 106c and 106d; an SAN (Storage Area Network) switching devices such as FC (Fibre Channel) switches 107a, 107b; and storage devices such as storages 108a, 108b, in addition to network devices such as a firewall 102, a load balancer 103, an L3 switch 104, an L2 switch 105a, 105b. It is not required to configure the system by using all of the above-described devices. The system for supplying the appropriate ICT service may be constructed by using appropriate types and appropriate number of the devices. A management server 109 is also coupled with the system and further coupled with a console 110.

The network device such as the firewall 102, load balancer 103, L3 switch 104 and L2 switch 105a, 105b, constructs a LAN (Local Area Network) to supply a network connectivity to the servers 106a to 106d and control packets to be transmitted and received by the servers. These network devices may be coupled respectively with the servers and may also be coupled with an external network of the management server 109 and the datacenter 100. A protocol for communicating in LAN includes Ethernet (registered trademark), and a protocol for communicating between LANs includes IP (Internet Protocol). These network devices have a virtual LAN technique such as VLAN, a virtual interface technique such as VLAN interface and sub-interface, and a virtual router technique such as VRF and VR to thereby configure a virtual network created over a physical network.

The server device such as the server 106a to 106d carries out an application for supplying the appropriate ICT service. These server devices are coupled with each other via the above-described network devices and also coupled with the outside of the datacenter 100. As described later, the server devices access to the storage device 108a, 108b via the FC switch 107a, 107b. Each of the server devices mounts NIC (Network Interface Card), HBA (Host Bus Adapter) or CNA (Converged Network Adapter) to thereby access to LAN and SAN. A plurality of virtual servers (VM) may also be created in the server device by VMM (Virtual Machine Monitor) technique or LPAR (Logical Partitioning) technique. In this case, the VM creates vNIC (Virtual Network Interface Card) as a virtual interface, vHBA (Virtual Host Bus Adaptor) and a virtual CNA and accesses to the network devices and storage devices via these virtual interfaces.

The SAN switching device such as the FC switch 107a, 107b, configures SAN to transfer an I/O (Input/Output) request from the server 106a to 106d to the storage 108a, 108b and also transfer I/O data read out from the storage 108a, 108b to the server 106a to 106d. The protocol for communicating in SAN and between SANs includes FC, FCIP (FC over IP), FCoE (FC over Ethernet) and iSCSI (Internet Small Computer System Interface). These SAN switching devices provide the virtualization technology, such as Zoning, NPIV (N Port_ID Virtualization) and VSAN (Virtual Storage Area Networking) Other virtualization technologies may be provided thereon.

The storage device, such as the storage 108a, 108b, provides an external storage area to the server 106a to 106d via the above-described SAN. The storage device 108a, 108b includes NPIV for virtualizing a physical port to be accessed to the storage and LU (Logical Unit) to be a logical volume configured in a physical storage. The storage 108a, 108b may provide a function of a port for the storage and for a LUN (Logical Unit Number) masking etc. to be associated the LU with the server.

The management server 109 collects a config (setting information of a device) possessed respectively in the devices in the system to create logical topology information for entirety or part of a virtual network to be constructed by the plural devices in the datacenter 100 by using the collected config. The management server 109 visualizes the created logical topology information to make display on a screen of the console 110.

In addition, the function of the configured devices (firewall, load balancer, etc.) in the above-described system may be provided by either hardware or software.

Figure 2:
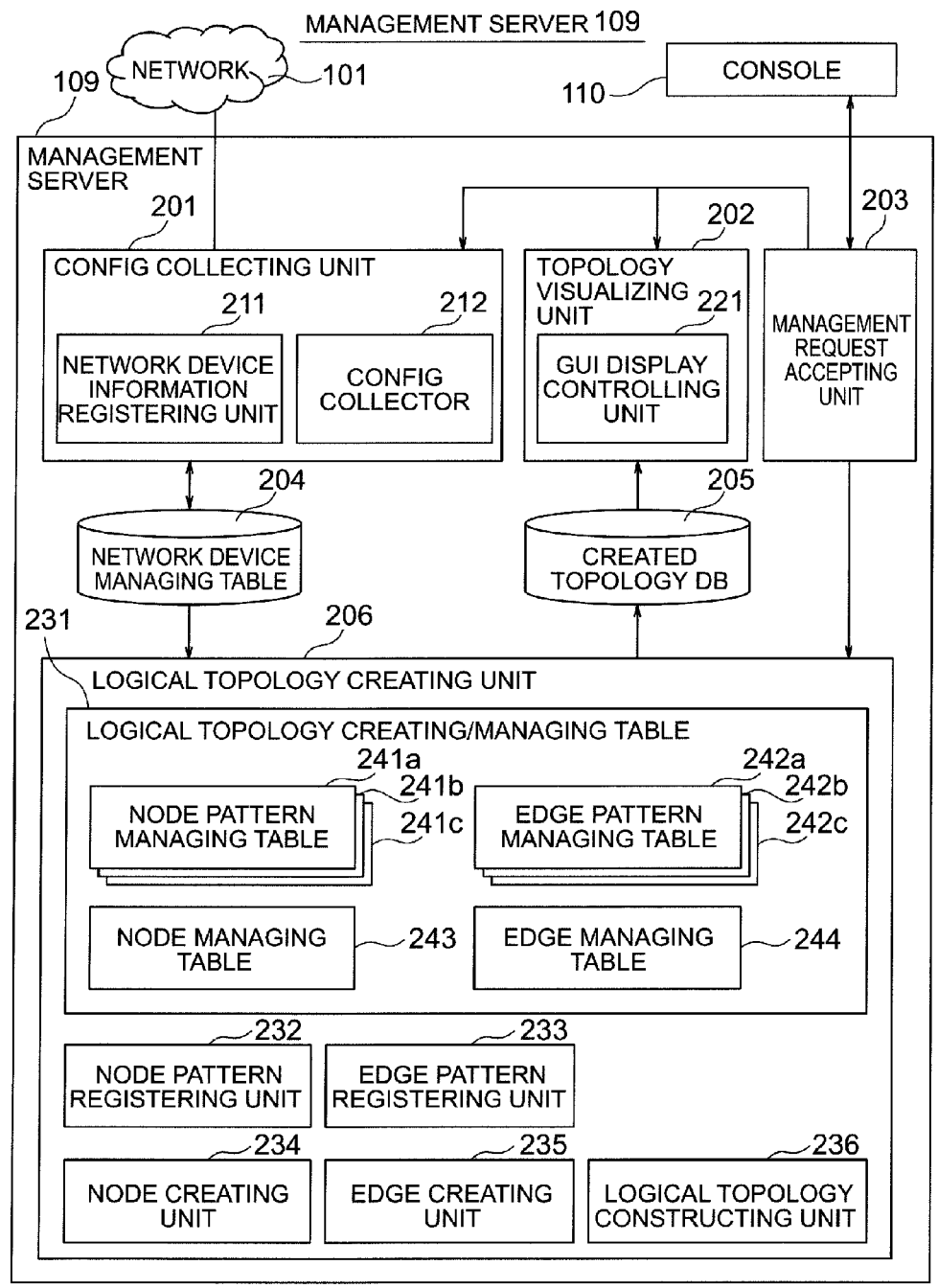
FIG. 2 is a diagram showing an example of a management server 109 in the embodiment.

FIG. 2 is a diagram showing an example of the management server 109.

The management server 109 has, as configuration elements, a config collecting unit 201, a topology visualizing unit 202, a management request accepting unit 203, a network device managing table 204, a created topology DB 205, and a logical topology creating unit 206.

The config collecting unit 201 collects the config from the network devices in the datacenter 100. The config collecting unit 201 includes, as configuration elements, network device information registering unit 211 and a config collector 212. The network device information registering unit 211 adds or deletes information required for collecting the config from the network devices in the datacenter 100 to or from an after-described network device managing table 204.

The config collector 212 refers to network device information of the network device managing table 204 to collect the config from the respective network devices in the datacenter 100. The collected config is stored as a config file in the management server 109 to hold as a stored file name list in the network device managing table 204, for example. In addition, the config collector 212 is not essential, but either method may be used if the management server 109 can analyze the config. For example, a manager may collect the config manually to then store as the config file in the management server 109.

The topology visualizing unit 202 visualizes the topology information in the created topology DB 205 to output to a logical topology to GUI (Graphical User Interface) screen by using a GUI display controlling unit 221.

The management request accepting unit 203 accepts a processing request regarding the creation of logical topology information from an operator to instruct an execution of the processing to after-described functioning units. The processing requested from the operator includes a collection of the config, a creation of the logical topology information on the basis of the collected config, and a visualization of the created logical topology, for example. In this example, the functioning units corresponding to the respective processing units are the config collecting unit 201, logical topology creating unit 206 and topology visualizing unit 202. In addition, the processing requested from the operator, as other, includes a registration of a node pattern and an edge pattern, for example. In this embodiment, a node pattern registering unit 232 and an edge pattern registering unit 233 are called out via the logical topology creating unit 206.

The network device managing table 204 holds information required for collecting the config from the network devices. Such information includes a device ID, a model, an IP address, a login name, a password, etc. The detail of network device managing table 204 will be described with reference to FIG. 3.

The created topology DB 205 holds the logical topology information created by the logical topology creating unit 206.

The logical topology creating unit 206 analyzes the config file collected by the config collecting unit 201 to create the logical topology information of virtual network and a graph structure made up of nodes and edges and store in the created topology DB 205.

The logical topology creating unit 206 includes, as configuration elements, a logical topology creating/managing table 231, the node pattern registering unit 232, the edge pattern registering unit 233, a node creating unit 234, an edge creating unit 235, and a logical topology constructing unit 236.

The logical topology creating/managing table 231 manages information for creating the nodes and edges from the config to also manage the created nodes and edges. The logical topology creating/managing table 231 includes one or more node pattern managing tables 241*a*, 241*b*, 241*c*, one or more edge pattern managing tables 242*a*, 242*b*, 242*c*, a node managing table 243, and an edge managing table 244. The node pattern managing tables 241*a* to 241*c* are referred when creating the nodes from the config, and the edge pattern managing tables 242*a* to 242*c* are referred when creating the edges from the config. The created nodes and edges are stored in the node managing table 243 and edge managing table 244, respectively.

The node pattern registering unit 232 registers the node pattern of config to the node pattern managing table 241*a*, 241*b* or 241*c*. For example, the manager newly enters the node pattern corresponding to a device when installing a new model device into the datacenter 100. A new node pattern is entered into the node pattern registering unit 232 via the management request accepting unit 203 and logical topology creating unit 206, and the node pattern registering unit 232 registers the newly entered node pattern into the node pattern managing table 241*a*, 241*b* or 241*c*.

In addition, the node pattern means a creation pattern (string pattern for creating a node) of a setting command indicating the creation of a virtual resource for the various virtualization technologies in the config. The detail of the creation pattern will be described with reference to FIG. 4.

The above-described virtual resource means an instance of virtual element created by the virtualization technology, moreover, the instance becoming a configuration element for the logical topology in the virtual network. The virtual resource includes the instance of the virtual LAN, of the virtual interface and of the virtual router, for example.

The edge pattern registering unit 233 registers the edge pattern of config in the edge pattern managing table 244. For example, a user newly enters the edge pattern to the corresponding device when installing the new model device into the datacenter 100. A new edge pattern is entered into the edge pattern registering unit 233 via the management request accepting unit 203 and logical topology creating unit 206, and the node pattern registering unit 232 registers the newly entered edge pattern in the edge pattern managing table 242*a*, 242*b* or 242*c*.

In addition, the edge pattern means a pattern of the connection command, which is a form of setting command indicating a connection between the virtual resources in the various virtualization technologies in the config. The detail of the pattern for the connection command will be described with reference to FIG. 5.

The connection between the virtual resources means a logical connection between the above-described virtual resources configuring the logical topology. The connection between the virtual resources includes the connection between the VLAN and VLAN interface, and between the VLAN interface and VRF.

The node creating unit 234 extracts a command corresponding to the creation of virtual resource among the configs of devices, on the basis of the node pattern managing table 241*a*, 241*b* or 241*c* to create the node corresponding to the above-described virtual resource on the basis of information containing the extracted command. The created node is stored in the node managing table 243. The detail of node creating unit 234 will be described with reference to FIG. 8.

The edge creating unit 235 extracts a command corresponding to the connection between virtual resources declared in the configs of devices, on the basis of the edge pattern managing table 242*a*, 242*b* or 242*c* to create the edge corresponding to the connection between the above-described virtual resources on the basis of information containing the extracted command. The created edge is stored in the edge managing table 244. The detail of edge creating unit 235 will be described with reference to FIG. 9.

The logical topology constructing unit 236 creates the logical topology information of virtual network in the datacenter 100 on the basis of the content in the node managing table 243 and edge managing table 244 to store in the created topology DB 205. A format of the topology information to be stored in this DB may appropriately be of an adjacency matrix, an incidence matrix, an adjacency list, an incidence list, etc. This embodiment adopts the format of adjacency list.

The node pattern managing table 241*a* to 241*c* associates the creation pattern indicating the creation of virtual resource in the various virtualization technologies in the config with a node type. The creation of virtual resource, as examples, includes a new creation of the instance of virtual interface and of the instance of virtual router. In addition, the above-described tables are prepared for every model of the devices. For example, the node pattern of a model aaa (FIG. 3) is present in the node pattern managing table 241*a*. The detail of node pattern managing table 241*a* will be described with reference to FIG. 4.

The edge pattern managing table 242*a* to 242*c* holds a connection pattern (string pattern for connecting a pair of nodes) indicating the connection between the virtual resources created with the various virtualization technologies in the config. The connection between the virtual resources includes, as examples, the logical connection between the instances of the virtual LAN and virtual interface and between the instances of the virtual interface and virtual router. These tables are prepared for every model of the devices. For example, the edge pattern of the model aaa is present in the edge pattern managing table 242*a*. The detail of edge pattern managing table 242*a* will be described with reference to FIG. 5.

The node managing table 243 manages the node to be created from the config. The detail of node managing table 243 will be described with reference to FIG. 6.

The edge managing table 244 manages the edge to be created from the config. The detail of edge managing table 244 will be described with reference to FIG. 7.

FIG. 3 is a diagram showing a configuration example of the network device managing table 204.

The network device managing table 204 manages information used for when collecting the config from the network device in the datacenter 100. The management target information includes a device ID 301, a model 302, an IP address 303, a user name 304, a password 305, and a file name 306 of the config. The device ID 301 specifies uniquely an individual network device from the entire network. The model 302, IP address 303, user name 304 and password 305 are information required for carrying out a remote login to the network device to collect the config. The file name 306 is used for holding the collected config. The network device managing table 204 may appropriately hold information other than the above-described information.

FIG. 4 is a diagram showing a configuration example of the node pattern managing table 241*a*.

The node pattern managing table 241*a* manages the creation pattern used to associate a node type 401 with a creation pattern 402 regarding the creation of a virtual resource, in relation to the model "aaa".

The node type represents the type of virtual resource. For example, a node N1 represents a virtual resource regarding the virtual LAN, a node N2 represents that regarding the virtual interface, and a node N3 represents that regarding the virtual router.

For example, a creation pattern 411 relates to the creation of virtual resource for VLAN (node N1) as one of the virtual LAN techniques. A creation pattern 412 relates to the creation of the virtual resource for VLAN interface (node N2) as one of the virtual interface techniques. A creation pattern 413 relates to the creation of the VRF (node N3) as one of the virtual router techniques. An indication matched with the creation pattern in the config is emerged to thereby create a node corresponding to the node type.

The following description will be concerned with contents written in each of the cells in the creation pattern 402. A first line in the cell means a start of setting a certain item, and the last line means an end of setting the item in the cell. For example, in the creation pattern 412 of VLAN interface, the line indicating "interface vlan <id>" means the start of setting a certain VLAN interface, and the last line indicating "!" means the last written line regarding this setting. Character strings, not indicated in the creating pattern 402, may be present in the area between the start and the end in the cell. For example, the line of "ip address" written in the creating pattern 412 is not essential yet may be present in this area. A condition which the creating pattern have to follow is that a type of node and an internal type ID can be identified in a node creating processing as described later. The internal type ID is ID (ID of virtual resource written in config) for uniquely specifying the node in a certain node type of a certain config. The indication of <id> in the creation pattern corresponds to the internal type ID in the example shown in the node pattern managing table 241*a*. For example, in the creation pattern 411 of VLAN (node N1), the indication <id> corresponding to VLAN number is the internal type ID of node type N1.

The structure of the above-described node pattern managing table 241*a* is not essential, but an appropriate structure may be adopted. The condition which the node pattern managing table 241*a* have to follow is that the creation pattern regarding the node can be identified from the config to be able to extract a node ID in the processing for creating the node. Therefore, a single table may configure so as to hold the model "aaa" in the line or creation pattern 402, the model "bbb" in another line of the creation pattern, and the model "ccc" on still another line of the creation pattern, without allotting the model "aaa", "bbb", "ccc" respectively to the node pattern managing tables 241*a*, 241*b*, 241*c*.

FIG. 5 is a diagram showing a configuration example of the edge pattern managing table 242*a*.

The edge pattern managing table 242*a* manages an edge type 501, a connection node type 502, and a connection pattern 503 regarding the connection between the virtual resources, for the model "aaa".

The edge type 501 represents a type of a connection relation between the virtual resources. For example, an edge E1 represents the connection between the respective virtual resources of the virtual LAN and virtual interface, an edge E2 represents that between those of the virtual interface and virtual router, and an edge E3 represents that between the two virtual resources of the virtual router. In this way, the respective type of edges is also associated with the node type (connection node type 502) of the two nodes to be coupled with the edge.

A connection pattern 511 relates to the edge E1 for coupling the virtual resource of VLAN (node N1) with that of VLAN interface (node N2), a connection pattern 512 relates to the edge E2 for coupling the virtual resource of VLAN interface (node N2) with that of VRF (node N3), and a connection pattern 513 relates to the edge 3 for coupling with the two virtual resources of VRF (node N3). An indication matched with the connection pattern in the config is emerged to thereby create a corresponding edge.

The following description will be concerned with contents written in cells of the connection pattern 503. The first line in the cell means a start of setting a certain item, and the last line means an end of setting the item. For example, the line starting from "interface vlan" is the first line, and the line ending at "!" is the last line, in the connection pattern 511. In addition, character strings, not indicated in the connection pattern, may be present in the area between the start t and the end in the cell.

For example, the line "ip address" written in the connection pattern 511 is not essential yet may be present is this area. The connection pattern 513 is made up of plural blocks: a block starting from the line "route-map" and ending at "!", and a block starting from the line "vrf definition" and ending at "!". The both blocks are associated mutually with a character string indicated by <name>. A character string, regardless of the edge, may also be present in between the both blocks.

The condition which the correction pattern have to follow is that the type of edge can be identified, and the internal type ID of the two nodes to be coupled to both ends of the edge can also be identified, in an after-described edge creating processing. The internal type ID is used for uniquely specifying the node regarding the node type present in a certain device, as described above. In this example, the internal type ID indicates as <id1>, <id2> in the connection pattern.

Specifically, in the case of the connection pattern 512 of edge E2, the indication <id1> corresponding to a VLAN interface number is the internal type ID for one node, and the indication <id2> corresponding to a VRF number is the internal type ID for the other node. In addition, the internal type ID for the both nodes is sometimes indicated as <id>, as indicated the connection pattern 511 of edge E1.

In addition, the structure of the above-described edge pattern managing table 242*a* is not essential, but an appropriate structure may be adopted. The condition which the edge pattern managing table have to follow is that the connection pattern regarding the edge can be identified from config to be able to extract an edge ID, in the processing of creating the edge. Therefore, a single table may hold the connection pattern of the model aaa in the line or connection pattern 503, the model bbb in another line of a connection pattern, and the model ccc on still another line of a connection pattern, without allotting the model "aaa", "bbb", "ccc" respectively to the edge pattern managing tables 242*a*, 242*b*, 242.

FIG. 6 is a diagram showing an example of the structure of the node managing table 243.

The node managing table 243 manages the nodes created on the basis of the creation pattern of the config in an integrated fashion. Each of the nodes has a node ID 601 for enabling to uniquely specify it in the entire virtual network.

The element of node includes the node type 401, a device ID 603 (ID of the device having the node), and an internal type ID 604.

A line 611 means that the virtual LAN number (internal type ID of node N1) has the virtual LAN (node N1) whose identification number (so-called VLAN ID) is 10. A line 612 means that the virtual interface number (internal type ID of node N2) has a virtual interface (node N2) which has the parameter 10 as its identification number (so-called VLAN interface ID) in a device SW1. A line 613 means that the virtual router number (internal type ID of node N3) has a virtual router (node N3) of parameter 1 in a device FW.

In addition, the structure of the above-described node managing table 243 is not essential, but an appropriate structure may be adopted. Other realizations of this table may include such that the table is divided into every node type and the table is divided into every device. The condition which the node managing table 243 have to follow is that the node of the respective node types of device can be managed in an integrated fashion.

FIG. 7 is a diagram showing an example of the structure of the edge managing table 244.

The edge managing table 244 manages edge information regarding the edge created on the basis of the connection pattern of the config in the integrated fashion. Each of the edges has an edge ID 701 for enabling to uniquely specify it in the entire virtual network, and the element of edge information includes the edge type 501, node IDs 601-1, 601-2 of the node to be coupled by the edge. In addition, the edge type 501 is not essential in the edge managing table 244, but essential information may be required for the connection between specified two nodes.

In addition, the structure of the above-described edge managing table 244 is not essential, but an appropriate structure may be adopted for enabling to manage the edge. The alternate structure of this table may include, as another example, such that the table is divided into every edge type.

Figure 8:
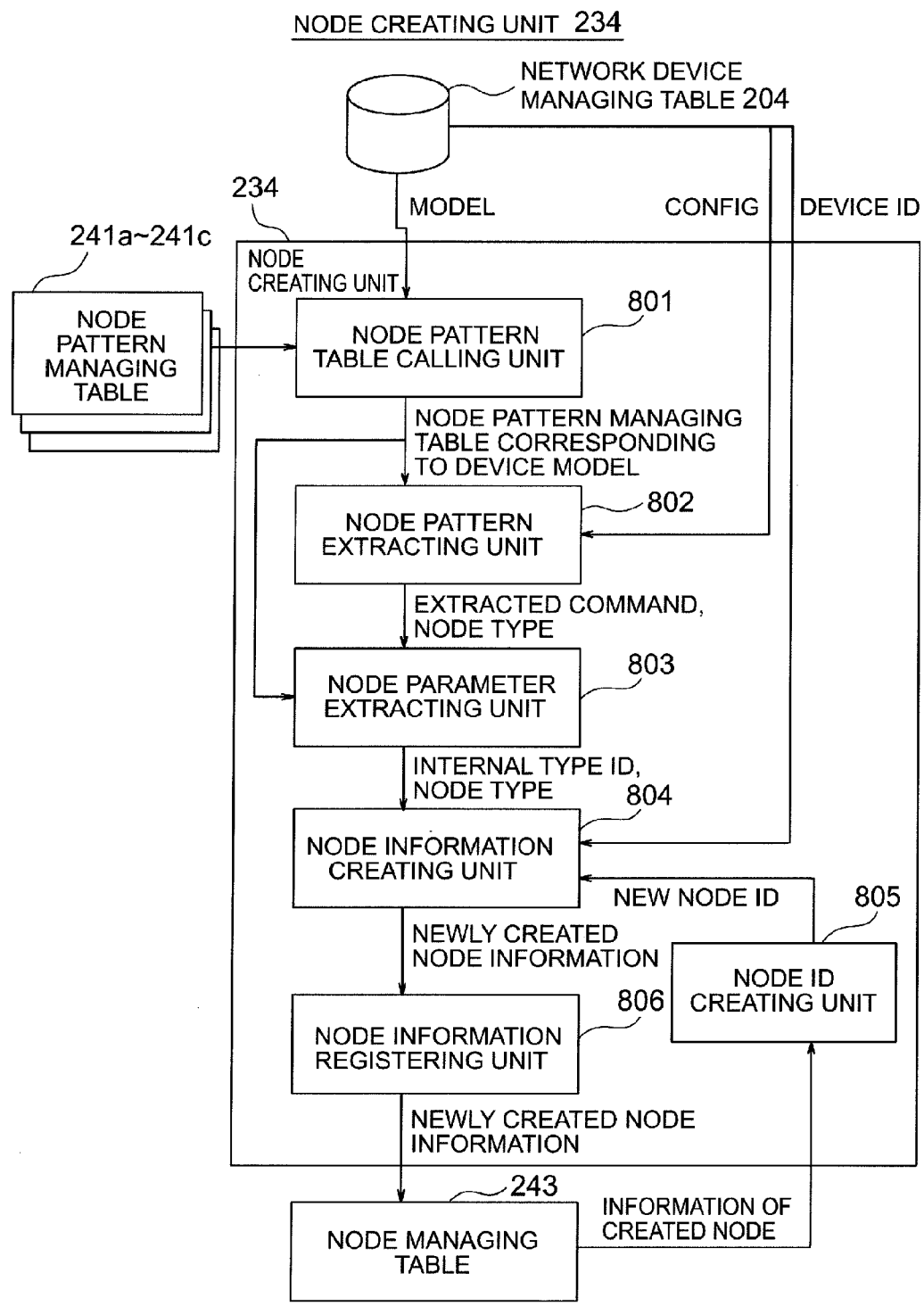
FIG. 8 is a diagram showing an example of a node creating unit 234.

FIG. 8 is a diagram showing a configuration example of the node creating unit 234.

The node creating unit 234 includes, as components, a node pattern table calling unit 801, a node pattern extracting unit 802, a node parameter extracting unit 803, a node information creating unit 804, a node ID creating unit 805, and a node information registering unit 806.

The node pattern table calling unit 801 calls the node pattern managing table 241a, 241b or 241c corresponding to the model of device having the config to be analyzed. Information of the device model is specified from the network device managing table 204. The node pattern table calling unit 801 is triggered by a topology information creating request from the manager to thereby carry out the calling via the management request accepting unit 203 and logical topology creating unit 206.

The node pattern extracting unit 802 extracts the setting command regarding the node from the config in accordance with the creation pattern written in the called node pattern managing table 241a, 241b or 241c.

The node parameter extracting unit 803 extracts the internal type ID of node for each of the extracted setting commands.

The node information creating unit 804 creates a node having an element of the node type, internal type ID and device ID.

The node ID creating unit 805 generates an ID for uniquely identifying the created node among the other nodes in the entire virtual network.

The node information registering unit 806 adds the created node to the node managing table 243.

Figure 9:
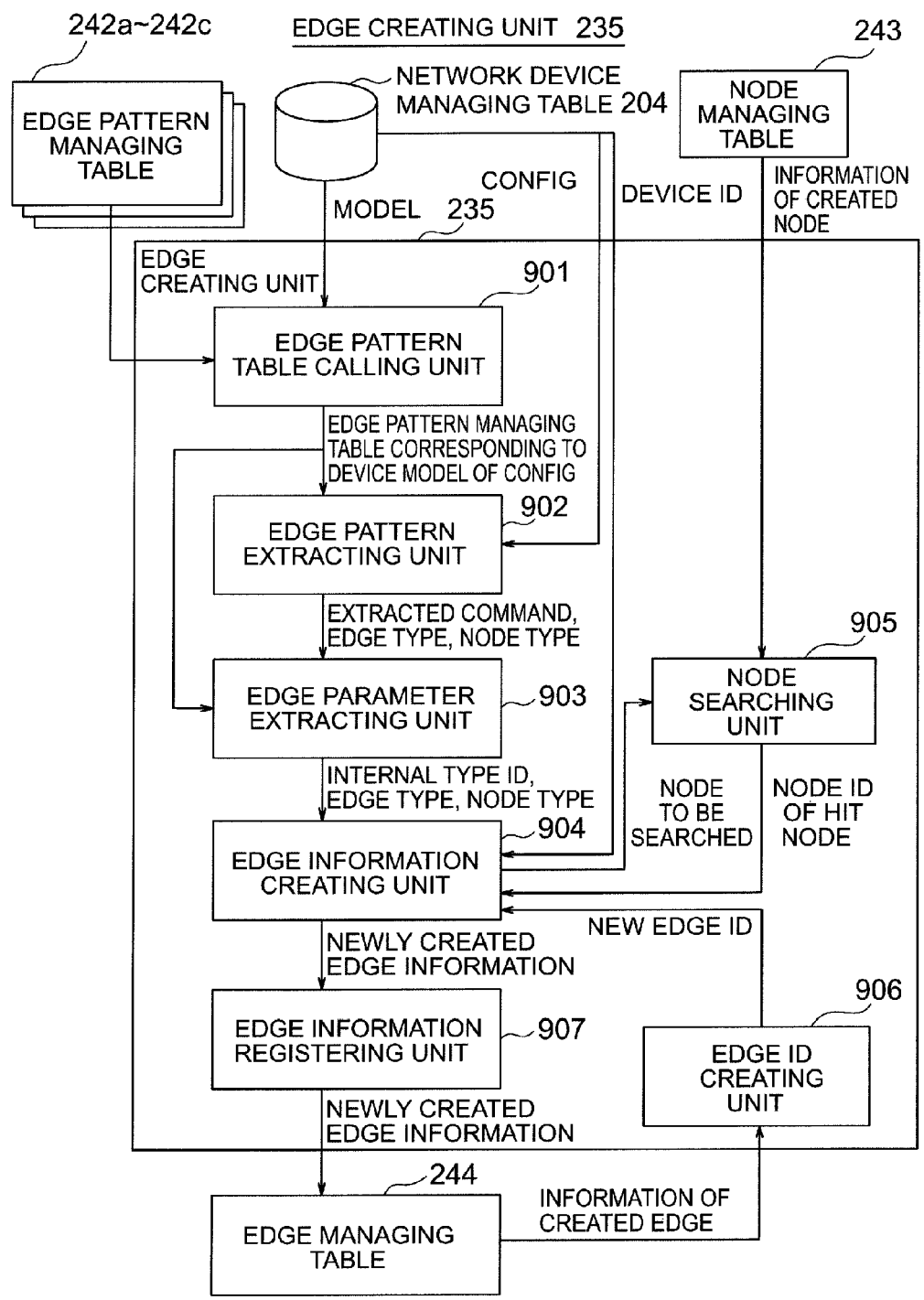
FIG. 9 is a diagram showing an example of an edge creating unit 235.

FIG. 9 is a diagram showing an example of the edge creating unit 235.

The edge creating unit 235 includes, as components, an edge pattern table calling unit 901, an edge pattern extracting unit 902, an edge parameter extracting unit 903, an edge information creating unit 904, a node searching unit 905, an edge ID creating unit 906, and an edge information registering unit 907.

The edge pattern table calling unit 901 calls the edge pattern managing table 242a, 242b or 242c corresponding to the model of device related to the config to be analyzed, and the model information is specified from the network device managing table 204.

The edge pattern extracting unit 902 extracts connection commands regarding the edge from the config on the basis of the called edge pattern managing table 242a, 242b or 242c.

The edge parameter extracting unit 903 extracts the internal type ID of two nodes to be coupled with the edge, from for each of the extracted connection commands.

The edge information creating unit 904 creates information (having an extracted internal type ID, device ID and node type, as elements of node) of the two nodes to be coupled with the edge.

The node searching unit 905 searches the two nodes from the node managing table 243, on the basis of the information of the two nodes to then return a node ID of the two nodes thereto. These two node IDs are included in the element of the created edge.

The edge ID creating unit 906 generates an ID for uniquely identifying the created edge among the other edges in the entire virtual network.

The edge information registering unit 907 adds the created edge to the edge managing table 244.

Figure 10:
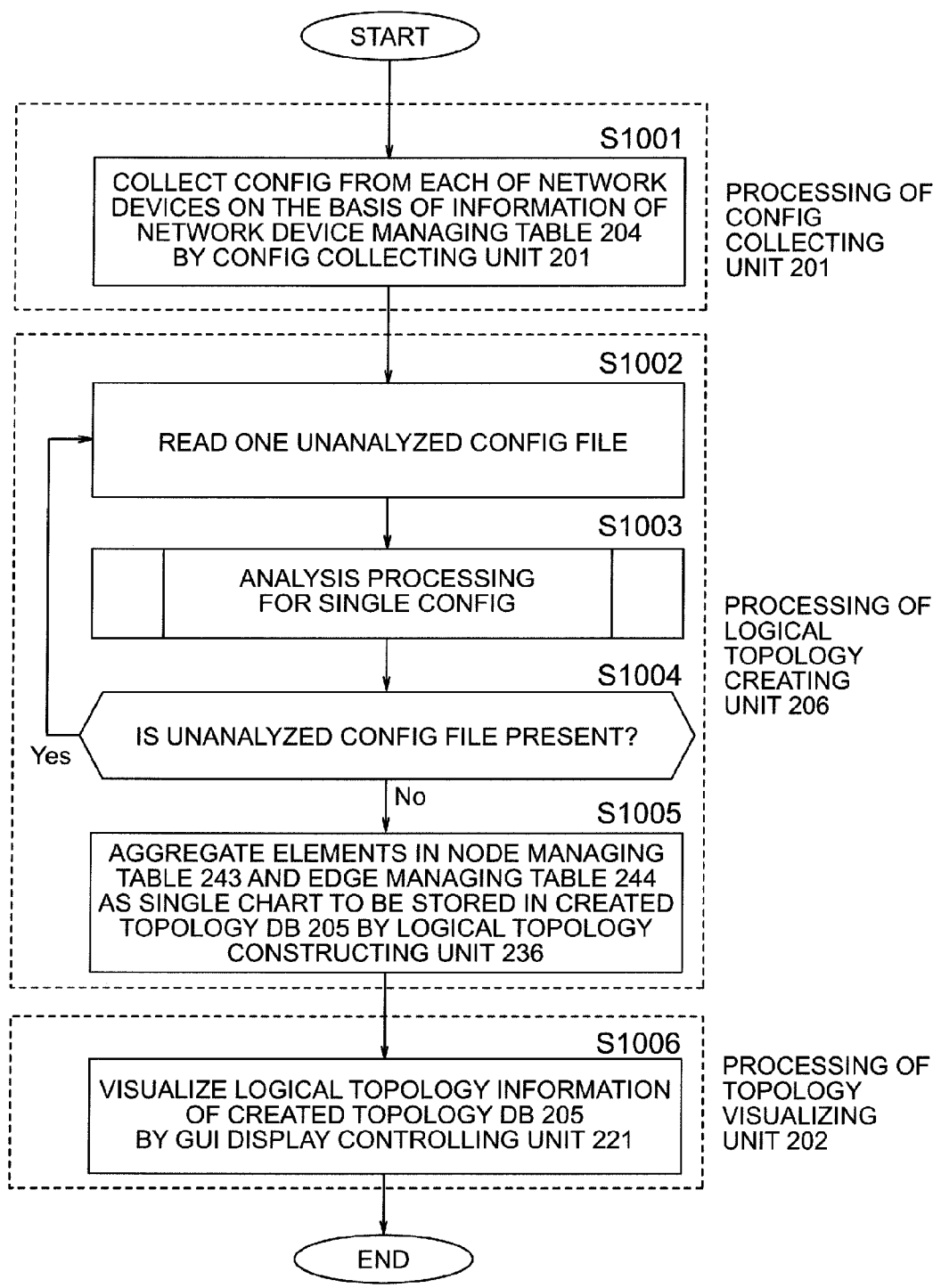
FIG. 10 is a flowchart showing an example of a processing sequence of a logical topology creation.

FIG. 10 is a flowchart showing a processing sequence for creating the logical topology information.

The config collecting unit 201 collects the config from each of the network devices on the basis of the information of network device managing table 204, at a step S1001. The method of using the collection for the config includes telenet, TFTP (Trivial File Transfer Protocol), NETCONF (Network Configuration Protocol), SNMP (Simple Network Management Protocol), etc.

A single unanalyzed config file is read in at a step S1002. An analysis processing of a single config is carried out for each of the configs collected from the devices, at a step S1003. The processing of the step S1003 creates one or more nodes and edges for the individual config. The detail of this processing will be described with reference to FIG. 11.

After all of the configs are analyzed and all of the nodes and edges are created, the logical topology constructing unit 236 aggregates the elements of node managing table 243 and edge managing table 244 as a single chart to store in the created topology DB 205 at a step S1005 if an unanalyzed config file is not present at a step S1004. If the unanalyzed config file is present, the processing returns to the step S1002.

Finally, the GUI display controlling unit 221 visualizes the logical topology present in the created topology DB 205 to display on the console 110, at a step S1006. In addition, the GUI display controlling unit 221 may carry out an operation, such as addition or deletion of a specific node and edge within the created logical topologies.

Figure 11:
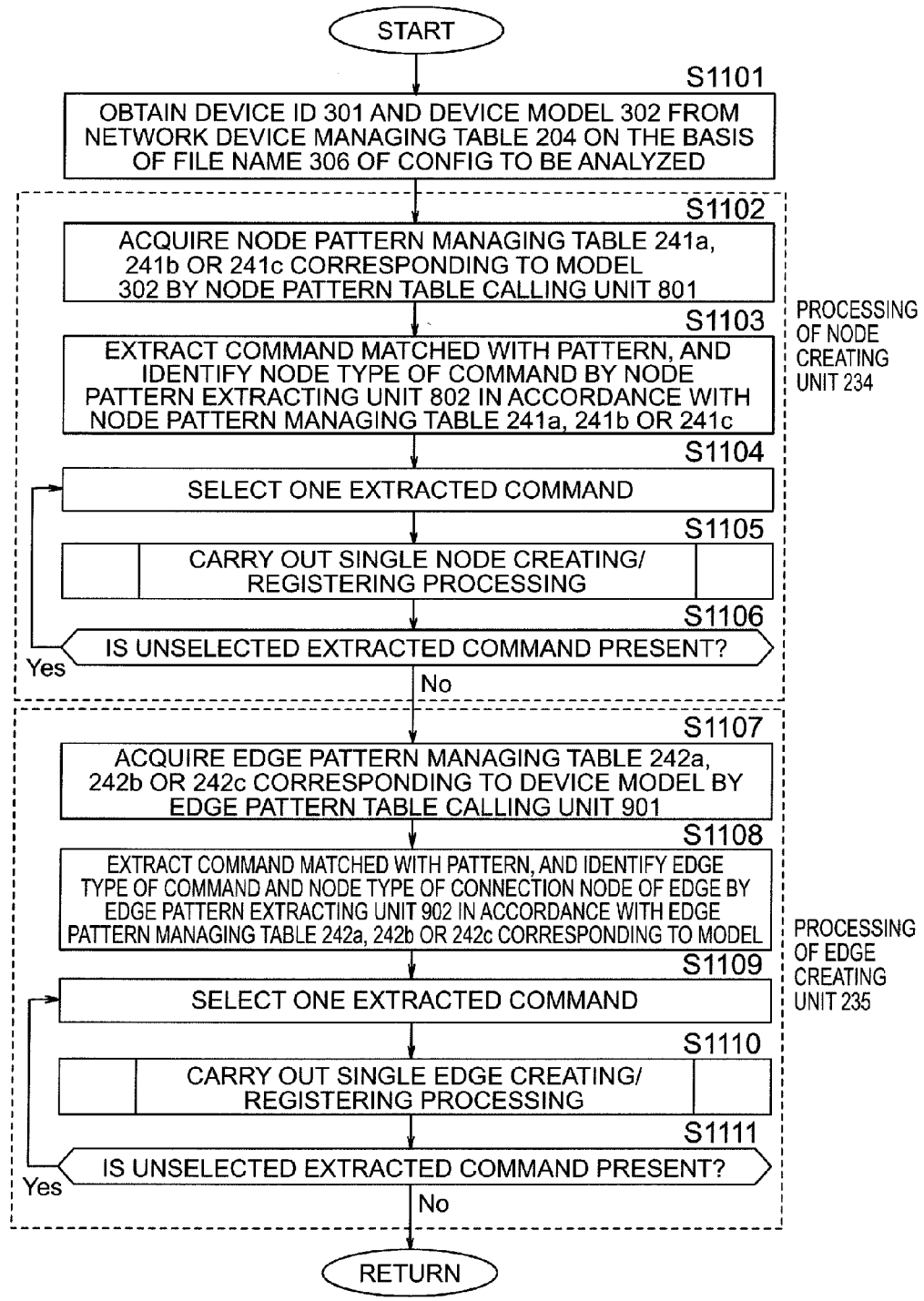
FIG. 11 is a flowchart showing an example of a processing sequence of an analysis processing of a single config at a step S1003.

FIG. 11 is a flowchart showing a processing sequence of the analysis processing of single config at the step S1003.

First, the device ID 301 and model 302 corresponding to the config are specified from the network device managing table 204, on the basis of the file name 306 of config for the analysis target, at a step S1101.

The processing then proceeds to a processing of node creation.

The node pattern table calling unit 801 specifies the node pattern managing table 241a, 241b or 241c corresponding to the model specified from the network device managing table 204, at a step S1102.

On the basis of the specified table, the node pattern extracting unit 802 extracts commands corresponding to the creation pattern 402 from the config to also identify the node type 401 corresponding to the extracted command, at a step S1103.

One extracted command is selected at a step S1104, and a creating processing and registering processing for a single node are carried out for each of the extracted commands, at a step S1105. A node corresponding to one extracted command is created in this processing to be registered in the node managing table 243. The detail of this processing will be described with reference to FIG. 12.

After completing the node creating processing, the processing proceeds to an edge creating processing.

If an unselected extracted command is not present at a step S1106, the edge pattern table calling unit 901 specifies the node pattern managing table 241a, 241b or 241c corresponding to the model acquired from the network device managing table 204 in regard to the config of analysis target, at a step S1107. The processing returns to the step S1104 if the unselected extracted command is present at the step S1106.

On the basis of the specified table, the edge pattern extracting unit 902 extracts the command corresponding to the connection pattern 503 from the config to also identify the edge type 501 corresponding to the extracted command and node type 502 of the two nodes to be coupled with the edge, at a step S1108.

One extracted command is selected at a step S1109, and the creating processing and registering processing for a single edge are carried out for each of the extracted commands, at a step S1110. This processing creates an edge corresponding to the extracted command to be registered in the edge managing table 244. The detail of this processing will be described reference to FIG. 13.

In addition, in this embodiment, the node creating processing is carried out for each of the commands after extracting all of the commands matched with the node pattern in the config, but this processing order is not essential. That is, an appropriate method of carrying out the node creating processing in regard to the extracted command may be adopted for the extraction of every command etc.

The processing order of the edge pattern extracting processing and edge processing is also not essential. That is, an appropriate method of carrying out the edge creating processing in regard to the extracted command may be adopted for the extraction of every command matched with the edge pattern.

In this embodiment, the edge creating processing is carried out after the node creating processing, however, this processing order is also not essential, and the both of processing may be carried out in parallel. That is, a parallel matching processing is carried out for the pattern regarding the node and edge while analyzing the config, and the node and edge associated with the corresponded pattern may be created appropriately. The individual node and edge may be created by any processing order if a condition is satisfied such that the node coupled with both ends of the edge is already created for when creating the edge.

Figure 12:
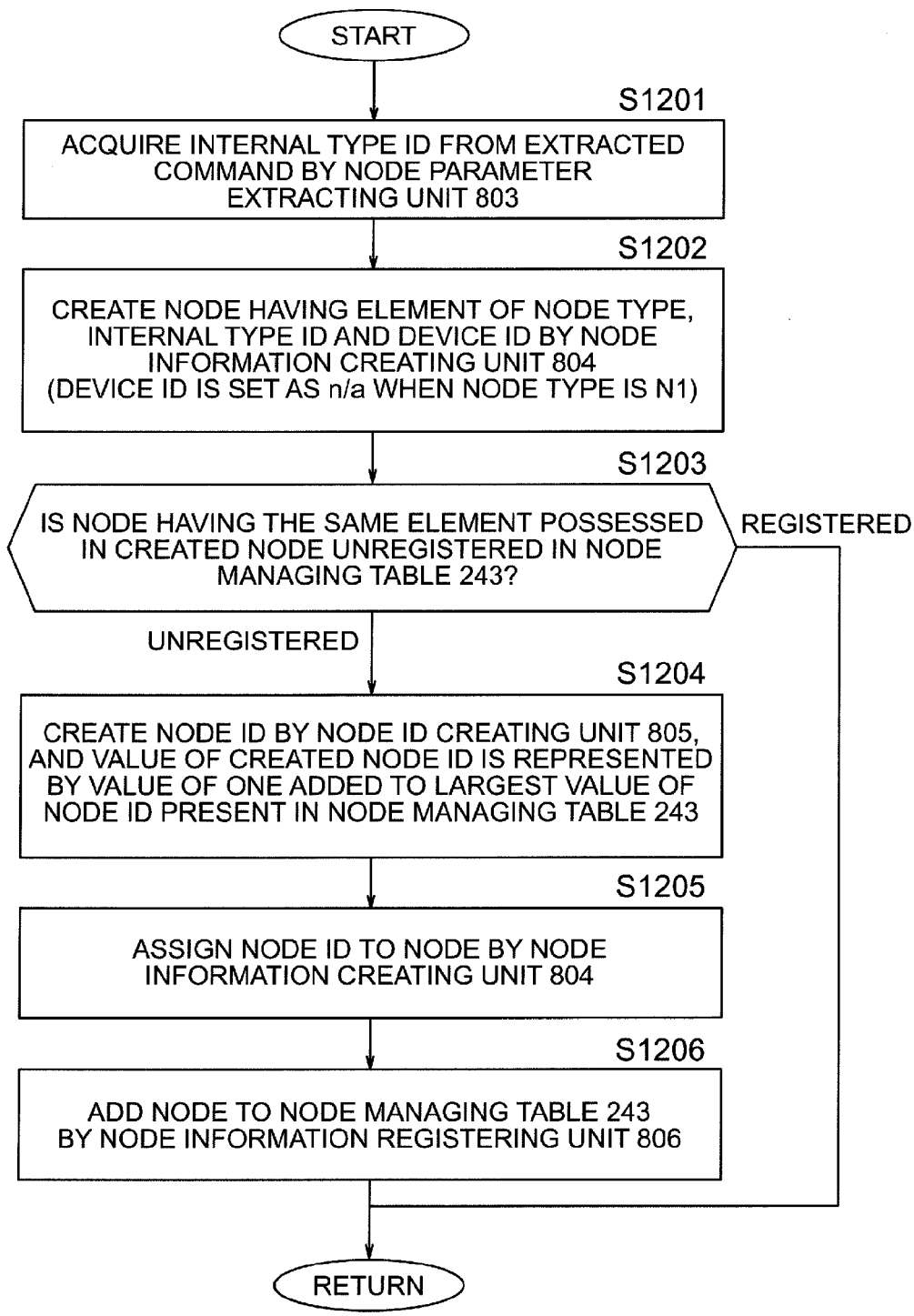
FIG. 12 is a flowchart showing an example of a processing sequence of a single node creating/registering processing at a step S1105.

FIG. 12 is a flowchart showing a processing sequence of the single node creating/registering processing at the step S1105. This processing creates the node corresponding to the extracted command to be registered in the node management table 243. To this end, the processing is carried out below.

First, the node parameter extracting unit 803 identifies the internal type ID from the extracted command, at a step S1201. Specifically, for the one extracted command at the step S1103, the internal type ID of the node is specified in accordance with the node type identified at the step S1103 and the creation pattern 402 in the node pattern managing table 241a, 241b or 241c.

The node information creating unit 804 then creates newly a node, at a step S1202. The element to be possessed in the newly created node has three: the node type (identified at the step S1103); the internal type ID (specified at the step S1201); and the device ID (specified at the step S1101). In addition, in the case where the node type is N1 (virtual resource of the virtual LAN technique), the device ID is exceptionally not assigned (or a fixed character string, such as n/a, is assigned to the device ID).

The processing then checks whether the node having the same element possessed in the created node is already present in the node managing table 243, at a step S1203. If the node is not present therein, the following processing carries out at steps S1204 to S1206. The single node creating/registering processing at the step S1105 terminates without carrying out the steps S1204 to S1206 if the node is present therein.

The node ID creating unit 805 creates a node ID for the newly created node, at the step S1204. In this embodiment, the node ID is set as integer, and the value incremented by one from the largest node ID among the node IDs of node present in the node managing table 243, is set as the node ID of the newly created node. In addition, the node ID may be determined by other methods. The condition which a format and creating rule of the node ID have to follow is that each of the nodes can be uniquely identified in the entire virtual network.

The node information creating unit 804 appends the above-described node ID to the newly created node, at the step S1205.

The node information registering unit 806 adds the newly created node having the newly assigned node ID to the node managing table 243, at the step S1206.

The above description is concerned with the single node creating/registering processing.

Figure 13:
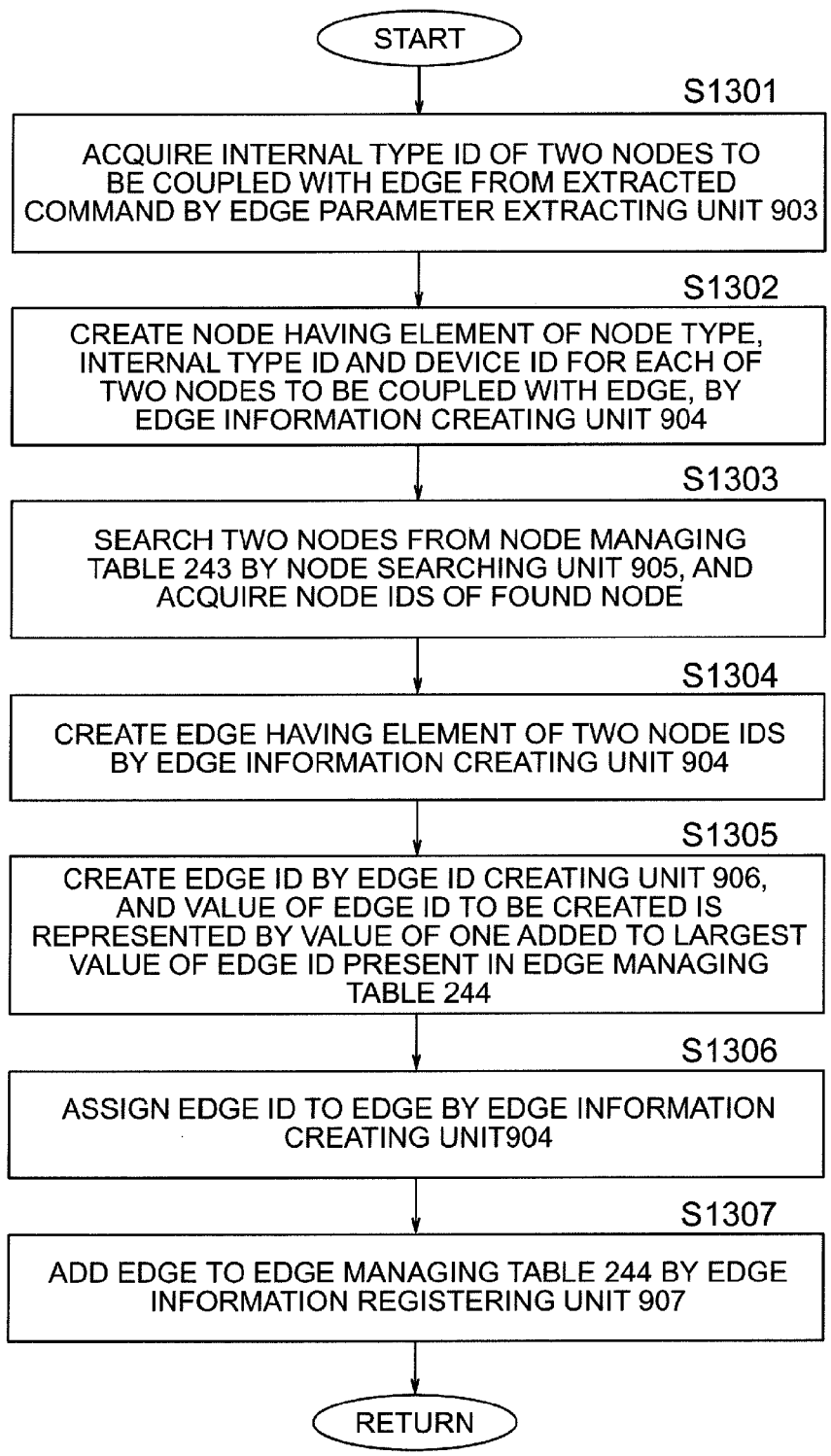
FIG. 13 is a flowchart showing an example of a processing sequence of a single edge creating/registering processing at a step S1110.

FIG. 13 is a flowchart showing a processing sequence of the single edge creating/registering processing at the step S1110. This processing creates an edge corresponding to the extracted command to be registered in the edge managing table 244. To this end, the following processing is carried out.

First, the edge parameter extracting unit 903 specifies the internal type ID of two nodes to be coupled with the edge, from the extracted command, at a step S1301. Specifically, for the one of commands extracted at the step S1109, the internal type ID of two nodes to be coupled with the edge is specified in accordance with the edge type identified at the step S1108, the node type of two nodes to be coupled with the edge, and the connection pattern 503 of edge pattern managing table 242a, 242b or 242c.

Next, the edge information creating unit 904 creates the node information of two nodes to be coupled with the edge, at a step S1302. The element to be possessed in the node has three: the node type (identified at the step S1108); the internal type ID (specified at the step S1301); and the device ID (specified at the step S1101). In addition, the device ID is not assigned exceptionally in the case where the node type is N1 (virtual resource of virtual LAN), or the fixed character string, such as n/a, is assigned to the device ID.

The node searching unit 905 then searches the node having the same attributes for the two nodes created at the step S1103, from the node managing table 243, at a step S1303. The node searching unit 905 passes the node IDs of two nodes found by the search to the edge information creating unit 904.

The edge information creating unit 904 newly creates an edge, at a step S1304. The elements to be possessed in the edge are the edge type and the node ID of two nodes to be coupled with the edge.

The edge ID creating unit 906 creates an edge ID for the newly created edge, at a step S1305. In this embodiment, the edge ID is set as integer, and the value incremented by one from the largest edge ID among the edge IDs of edge present in the edge managing table 244, is set as the edge ID of the newly created edge. In addition, the edge ID may be determined by other methods. The condition to a format and creating rule of the edge ID have to follow is that each of the edges can be specified uniquely in the entire network.

The edge information creating unit 904 assigns the above-described edge information to the newly created edge, at a step S1035.

The edge information registering unit 907 adds the newly created edge having the assigned edge information to the edge managing table 244, at a step S1306. The edge information registering unit 907 adds the edge to the edge managing table 244, at a step S1307.

The above description is concerned with the single edge creating/registering processing.

Figure 14:
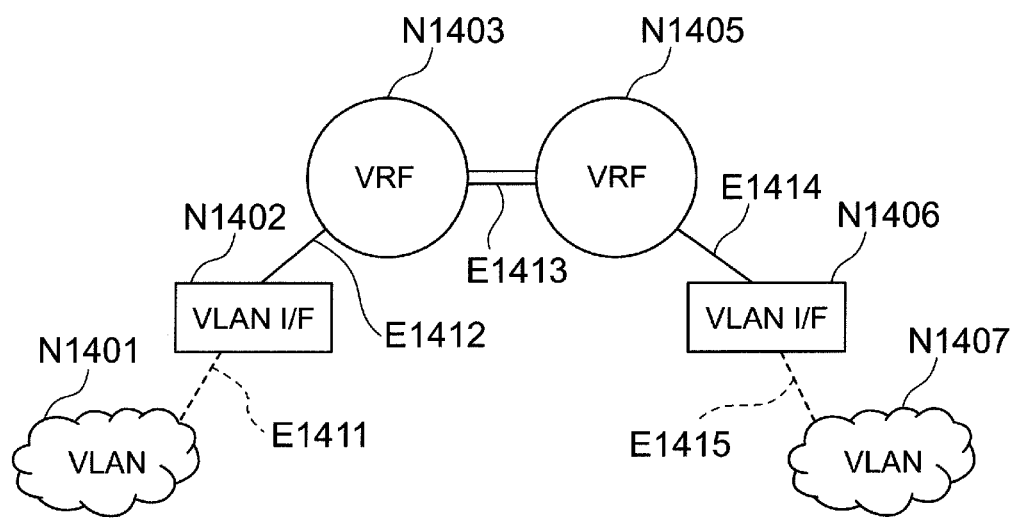
FIG. 14 is a diagram showing an example of a logical topology.

FIG. 14 is a diagram showing an example of the topology created by the above-described topology creating processing.

The node created from the config corresponds to N1401 to N1407, and created edge corresponds to E1411 to E1415. The node N1 corresponds to N1401, N1415, the node N2 corresponds to N1402, N1406, and the node N3 corresponds to N1403, N1404. The edge E1 corresponds to E1411, E1415 coupled with the node of node type N1, N2. The edge E2 corresponds to E1412, E1414 coupled with the node of node type N2, N3. The edge E3 corresponds to E1413 coupled with the two nodes of node type N3.

Figure 15:
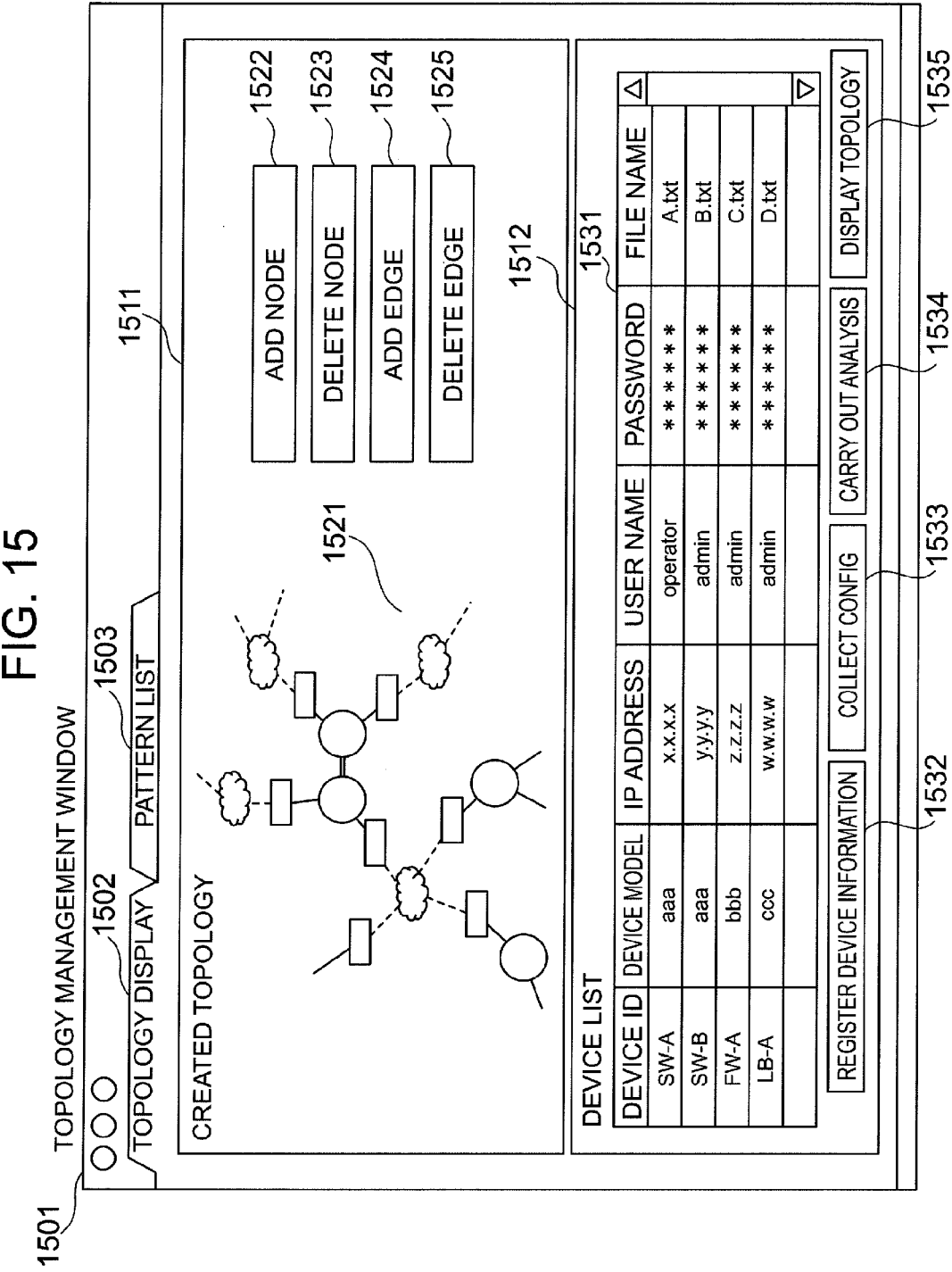
FIG. 15 is a diagram showing an example of a logical topology managing screen.

FIG. 15 is a diagram showing an example of a topology management window.

A topology management window 1501 is displayed on the console 110 and includes a topology display tab 1502 and a pattern list tab 1503, for example.

The topology display tab 1502 displays a successive item therein, for displaying the created topology information, and includes a created topology display area 1511 and a device list display area 1512.

The pattern list tab 1503 displays the node pattern managing table 241a, 241b, 241c and edge pattern managing table 242a, 242b, 242c corresponding to the models of network device. The node pattern managing table and edge pattern managing table for the new model are added to this screen, for example.

The created topology display area 1511 displays visualized logical topology information 1521. In addition, the created topology display area 1511 may include buttons 1522 to 1525 for controlling the display such that the node and edge of the displayed topology are added or deleted. For the visualization, an appropriate method may be adopted such that the display for the virtual interface (node N2) is omitted, the display is carried out by a representing method of directly coupling the virtual LAN (node N1) with the virtual router (node N3), etc.

The device list display area 1512 displays a network device list 1531, and this tab has a button 1532 for registering the device information in the network device list 1531, a button 1533 for carrying out the config collection from the network device, a button 1534 for carrying out the creation of logical topology information with the collected config, and a button 1535 for displaying the created topology information on the screen.

Figure 16:
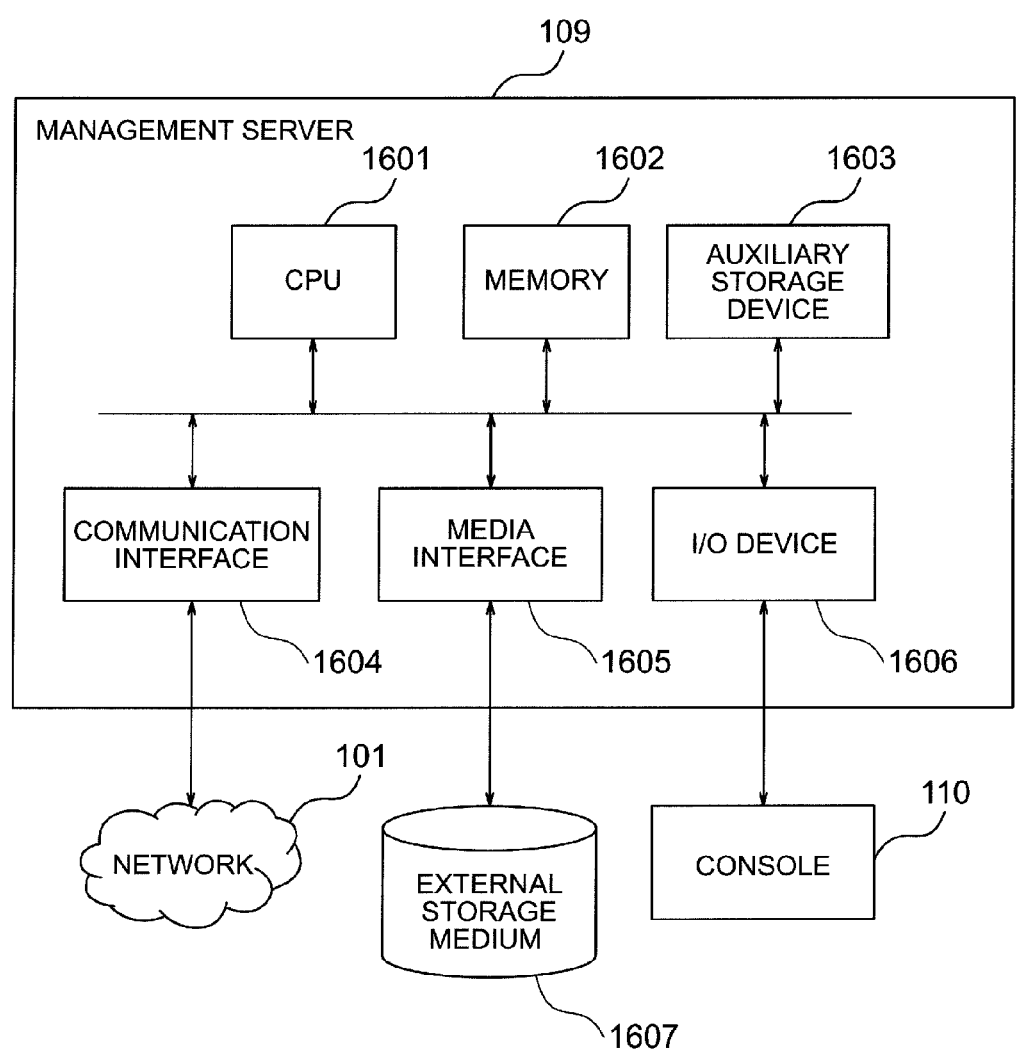
FIG. 16 is a diagram showing an example of a device configuration of the management server 109.

FIG. 16 is a diagram showing components of management server 109. The management server can be realized by using a commodity computer providing a CPU 1601, a memory 1602 and an auxiliary storage device 1603. Functions of devices configuring the management server 109 are realized on the computer by executing programs stored in the auxiliary storage device 1603 by CPU 1601. The programs may be stored in the auxiliary storage device 1603 in the computer in advance. Alternatively, the programs may be derived from other device to the auxiliary storage device 1603 via a usable medium by the computer through a communication interface 1604 and a media interface 1605, as required. The media includes a communication media (or wire, wireless optical network, carrier wave propagating on the network, and digital signal) or an external storage medium 1607 removable from the media interface 1605. In addition, the management server 109 may be coupled with the console 110 for operating it through an I/O device 1606.

According to this embodiment, the logical topology can be acquired rapidly and accurately in the virtual network constructed by using the plural virtual technologies. By visualizing the created topology information, a difference caused by an individual skill can be resolved for creating a logical topology diagram to therefore keep the quality of logical topology diagram constant. The correctness of config can be verified intuitively by viewing the visualized logical topology.

In this embodiment, the three types of nodes are defined as N1, N2 and N3, and the virtual LAN ID, virtual interface ID and virtual router ID are assigned as internal type ID for the respective nodes. In contrast, in response to the configuration of system to be constructed in the datacenter 100, it is also useful that the information is added to the node as described below. That is, it is useful that the node managing table 243 is extended, as a method described below.

First, the method includes a physical functional element which is not virtual. For example, a number "0" (number cannot be set as virtual LAN) of the virtual LAN is allotted as ID of a physical LAN, or a physical resource is regarded as one of the virtual resources such that the number "0" of the virtual router number is allotted as ID of a physical router etc. A physical resource is regarded as one virtual resource. This method is useful such that the physical LAN in addition to the virtual LAN, a physical interface in addition to the virtual interface and the physical router in addition to the virtual router, are also functioned as resources used for the network communication, for example.

There is a method of appending IP segment information to the virtual LAN. In this method, one VLAN has plural IP segments, which is effective for the case of routing inside VLAN. In this case, the IP segment information is appended to the virtual LAN in addition to the virtual LAN number, and IP address of interface is appended, as the internal type ID of N2, in addition to a virtual interface number. The IP segment information is written in the config, therefore, the node pattern managing table 241a, 241b, 241c is simply extended so as to extract this information.

There is a method of adding a physical connection information of LAN. In this method, it is required to redefine the system of node and edge, that is, the node N1, N2 and N3, and the edge E0, E1, E2 and E3. The node N1 represents the physical interface, the node N2, N3 represent the virtual interface and virtual router, respectively, likewise this embodiment. The edge E0 means that the physical interfaces are coupled with a physical link, the edge E1 means that a setting relation between the physical interface and virtual interface, and the edge E2, E3 means the same as described in this embodiment. The element to be possessed in the node type N1 to be redefined has three: the node type; the device ID; and a pair of a physical interface ID and the virtual LAN ID. The two of nodes N1 are coupled with the edge E0 in the case where two physical devices are coupled with a physical link. The nodes N1, N2 are coupled with the edge E0 in the case where the virtual LAN is allotted to the physical interface. This method is useful for when the detail of topology of the virtual LAN needs to be acquired, in the case where it is possible to obtain physical connection information.

Finally, there is a method of containing information of a server and a storage. The server and storage can also be represented by using the node N1, N2 and N3, and the edge E1, E2 and E3, defined in this embodiment. The information regarding the server device represents such that VM corresponds to the node N3, vNIC and vHBA corresponds to the node N2. The information regarding the storage device and SAN switching device represents such that LU and VSAN corresponds to the node N3, the virtual interface created by VSAN interface and NPIV corresponds to the node N2, and a zone created by Zoning corresponds to the node N1. These functional elements associated with each other can also be applied to the edge. The node and edge different from the node N1, N2, N3 and the edge E1, E2, E3 defined in this embodiment may be defined, and these nodes and edges may also be corresponded to the virtualization technology of the server and storage.

The config of the network device may be of MIB (Management Information Base) collected by SNMP (Simple Network Management Protocol). In the case of adopting this method, information required for the network device managing table 204 is a community name of SNMP etc. It is required to change the creation pattern of the node pattern managing table 241a, 241b, 241c and edge pattern managing table 242a, 242b, 242c so as to follow the format of MIB.

Although the present disclosure has been described with reference to example embodiments, those skilled in the art will recognize that various changes and modifications may be made in form and detail without departing from the spirit and scope of the claimed subject matter.

The invention claimed is:

1. A non-transitory computer-readable storage medium containing a first set of instructions, which executed by a processor, allow the processor to:
   (1) extract extracted instances information of a plurality of virtual resources and extracted logical connection information among a plurality of the instances of the virtual resources from device setting information with referring to a plurality of creation patterns and a plurality of connection patterns,
   wherein the connection patterns include a connection string pattern of setting information of a type of device regarding logical connection among each of instances of a plurality of the virtual resources,
   wherein the creation patterns include a creation string pattern of setting information of the type of device regarding definition of instances of virtual resources of plural types of virtualization technologies including virtual LAN technologies,
   wherein the virtual LAN technologies includes a virtual interface and a virtual router,
   and
   (2) generate a logical topology information of a virtual network according to both the extracted instance information of the virtual resources and the extracted logical connection information among the resources of the virtual resources, wherein the virtual network includes a plurality of virtual network devices and is configured on an information processing system in which a plurality of physical devices including network devices are connected with a physical network and, wherein the virtual network is configured with the physical devices in such a manner that instances of a plurality of types of virtual resources generated by plural types of virtualization technologies are connected with each other by logical connections.

2. The non-transitory computer-readable storage medium containing the first set of instructions, according to claim 1, wherein the first set of instructions further allow the processor to:
   generate virtual resource information for a plurality of virtual resources based on the virtual LAN technologies, virtual interface and a virtual router technology, wherein the virtual resource information includes:
   information on a type of the virtual resources and an identifier for identifying the instance of the virtual resource of the type of the virtual resources, and the information of the connections among the instances of the virtual resources includes information of pairs of the virtual resources to be connected.

3. The non-transitory computer-readable storage medium according to claim 2, wherein:
   the virtualization technologies further include virtual server technologies,
   the physical devices include either one of or both of a physical server device or a physical network device,
   wherein each of the plurality of virtual network devices is arranged to be specified by;
   (1) assigning a network function to a virtual server device to be logically generated within the physical server device with one of the virtual server technologies, or
   (2) preparing one or more of the plurality of virtual network devices to be logically generated within the physical network device with ones of a virtual interface technologies
   wherein virtual resource information is generated for each of the virtual LAN technologies, the virtual interface technologies, and virtual router technologies, the virtual resource information includes both information on the type of the virtual resources and the identifier for identifying the instance of the virtual resource.

4. The non-transitory computer-readable storage medium according to claim 2, wherein:
   a node type indicating the type of the virtual resources is associated with information on the creation patterns, and
   an edge type indicating connection relationship among the virtual resources is associated with information on the connection patterns,
   the node type showing one of the virtual LAN, the virtual interface or the virtual router, and the edge type showing one of connections between the virtual LAN and the virtual interface, between the interface and the virtual router, or, between the virtual routers.

5. The non-transitory computer-readable storage medium according to claim 2, wherein the creation patterns are arranged to record relationship between an instance of the virtual resources to be generated in accordance with the virtual LAN technologies and an IP address assigned to the instance of the virtual resources generated, wherein:

the identifier for identifying instances of the type of the virtual resources includes the IP address of the virtual resources, and wherein a management server is configured to extract and manage the information of the IP address to be assigned to the virtual resources showing the virtual interface having been extracted.

6. The non-transitory computer-readable storage medium according to claim 1, wherein
one or more instances are generated by using one or more virtual interface technologies and one or more virtual router technologies
wherein the instance information further comprising an identifier of the physical device that created the instance.

7. The non-transitory computer-readable storage medium according to claim 6, wherein:
information on an instance of the virtual resources is defined as a node;
wherein information on an instance of the logical connection between a pair of each of the instances of the plurality of the virtual resources is defined as an edge;
wherein a graph is generated and displayed as logical topology information with using both the node and the edge.

8. The non-transitory computer-readable storage medium according to claim 1, wherein the virtual network includes one or more of physical resources of a physical interface and a physical router, wherein instance information of the physical resources includes:
(1) information on type of the physical resource,
(2) a first identifier of a physical device having an instance of the physical resource, and
(3) a second identifier for identifying instances of resources in a same type of resource, wherein:
a management server is configured to regard the physical resource as an instance of virtual resource and is configured to commonly manage the instances of the physical resources and the virtual resources using a same set of identifiers.

9. A method of a system for defining a management, server that manages a virtual network, the method comprises:
acquiring a creation pattern that includes a string pattern of setting information of a type of device regarding definition of instances of virtual resources of plural types of virtualization technologies including virtual LAN technologies, wherein the virtual LAN technologies includes a virtual interface and a virtual router; and
acquiring, a connection pattern that includes a connection string pattern of setting information of the type of device regarding logical connections among each of instances of a plurality of the virtual resources,
extracting instance information for the plurality of the virtual resources based on the creation pattern and the connection pattern;
extracting logical connection information from the logical connections among the instances of the virtual resources from the device defining information based on the creation pattern and the connection pattern, and
generating a logical topology information of the virtual network that includes a plurality of network devices according to both the extracted instance information of the virtual resources and the logical connection information among the resources of the virtual resources.

10. The method according to claim 9, wherein:
the virtual network is configured by using one or more among the virtual LAN technologies, the virtual interface and a virtual router technology,
wherein the network devices include either one of or both of a physical network device or a virtual network device,
wherein arranging the virtual network device to be specified by:
(1) assigning a network function to a virtual server device to be logically generated within a server device, or
(2) preparing a virtual device to be logically generated within the physical network device.

11. The method according to claim 10, wherein:
a node type indicating type of the virtual resources is associated with information on the creation pattern, and
an edge type indicating connection relationship among the virtual resources is associated with information on the connection pattern,
the node type showing one of the virtual LAN, the virtual interface or the virtual router, and the edge type showing one of connections between the virtual LAN and the virtual interface, between the interface and the virtual router, or, between the virtual routers.

12. The method according to claim 9, wherein further comprising:
generating virtual resource information for a plurality of virtual resources by using one or more among the virtual LAN technologies, the virtual interface and a virtual router technology, wherein the virtual resource information includes:
(1) information on type of the virtual resources and an identifier for identifying the instance of the virtual resource, and
(2) information of two of the virtual resources to be connected in the connection information among instances of the virtual resources.

13. The method according to claim 12, the instances generating using one or more among the virtual LAN technologies, the virtual interface and the virtual router technology further comprising an identifier of a physical device including instance of the virtual resource.

14. The method according to claim 12, wherein:
information on the instances of the plurality of virtual resources is defined as a node;
wherein information on logical connection among the instances of the plurality of virtual resources is defined as an edge;
wherein a graph is generated and displayed as logical topology information with using both the node and the edge.

15. The method according to claim 12, further comprising:
arranging the creation pattern to record relationship between the instances of the virtual resources to be generated in accordance with the virtual LAN technologies and IP address assigned to the instances of the plurality of virtual resources
identifying instances of the type of the virtual resources including the IP address of the virtual resources, and wherein the management server is configured to extract and manage IP address information to be assigned to the virtual resources.

16. The method according to claim 9, wherein the virtual network including one or more of physical resources of a physical interface and a physical router, wherein an instance of the physical resource includes:
(1) information on type of the physical resource,
(2) a first identifier of a physical device having an instance of the physical resource, and
(3) a second identifier for identifying instances of resources in a same type of resource, wherein:

the second identifier of the instances of the physical resources are different from the second identifier of the instances of the virtual resources, wherein
the management server is configured to commonly manage the instances of the physical resources and the virtual resources with using the identifiers.

* * * * *